July 25, 1939.  K. A. KÖRBER  2,167,517
WEIGHT RECORDING AND REGISTERING APPARATUS
Filed Feb. 24, 1937
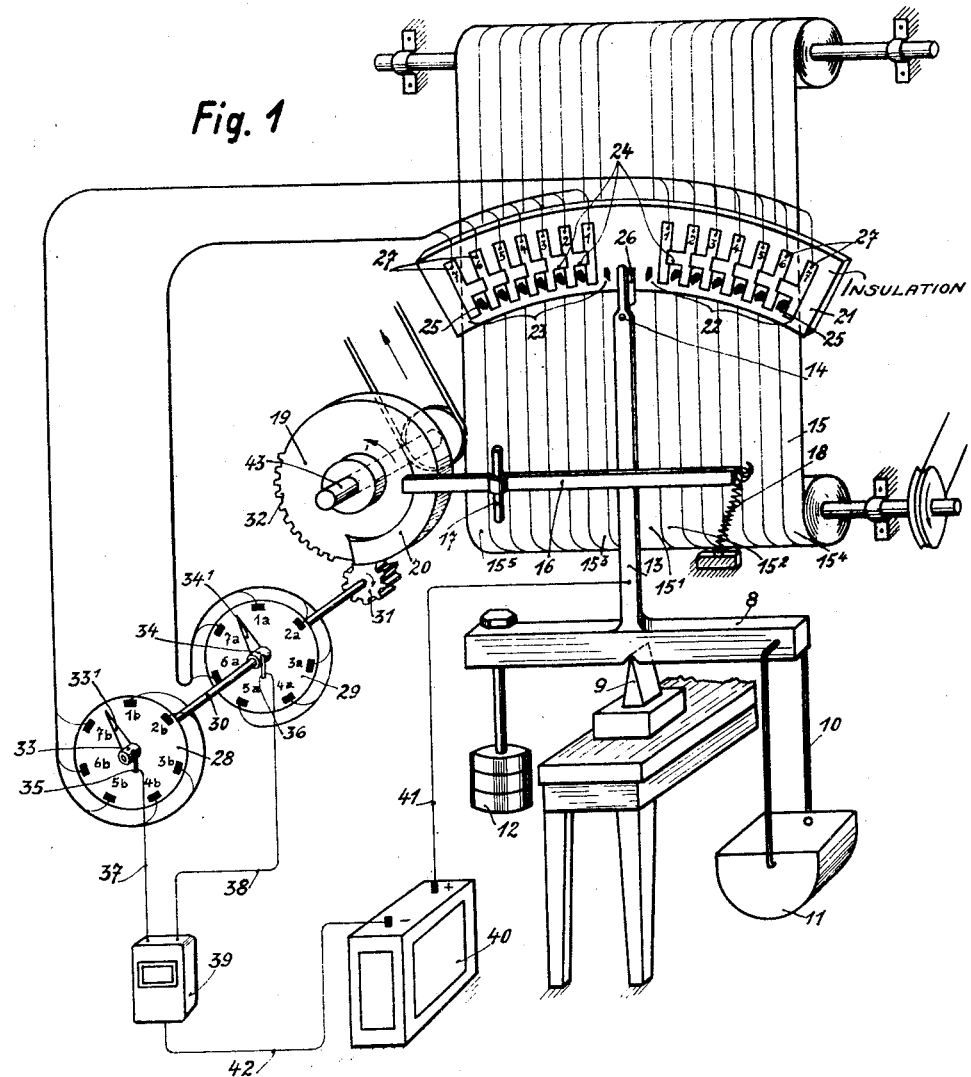
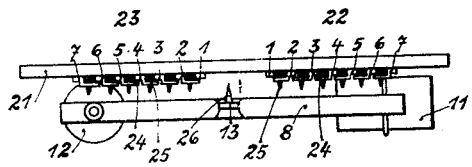
INVENTOR.
Kurt Adolf Körber
BY C. P. Goepel
his ATTORNEY Patented July 25, 1939

2,167,517

UNITED STATES PATENT OFFICE 2,167,517

WEIGHT RECORDING AND REGISTERING APPARATUS

Kurt Adolf Körber, Dresden-Oberloschwitz, Germany, assignor to "Universelle" Cigarettenmaschinen-Fabrik J. C. Mueller & Co., Dresden, Germany Application February 24, 1937, Serial No. 127,368
In Germany February 29, 1936

1 Claim. (Cl. 265—5)

The present invention relates to a weight recording and registering apparatus for recording and showing the mean weight of a number of the products of a machine selected at any given time, such as during the hours of a working day, and has for an object to provide means for showing whether the individual products are running either light or heavy with reference to a predetermined desired weight in the product.

In the case of cigarette machines, it is customary to take at regular intervals a number of cigarettes, such as twenty, and to check their weight in order to determine whether or not the cigarette machine is turning out the cigarettes of the prescribed weight. In this procedure, provision has been made for registering each individual operation by the pointer of a balance which is pressed at each weighing operation against a registration surface having a zero line so as to show on the surface deflections in either direction, deviating from the zero line, incident to either light or heavy weight of the cigarette with reference to its prescribed weight.

If it is desired to have a complete survey of the production of the machine within a definite time, such as a working day, then the markings on the registration surface, which corresponds to very definite values in the positive or negative direction, must be added together in order to ascertain, by subtraction of the negative deflection from the positive ones, to what extent too much or too little tobacco has been consumed by the machine during the manufacturing of the cigarettes. At the present time, to make this calculation is a laborious task which is a source of considerable error, and which above all permits a survey of the total production of the machine only at the end of the operating period, after the calculation has been completed.

In contra-distinction to this present invention provides means for continuously showing the positive or negative conditions of weight of the cigarettes which are picked out for weighing, so that any time during the working day the exact consumption of the tobacco by the machine may be ascertained, and consequently an immediate correction of the feeding of the tobacco may be made.

According to this invention each individual deflection of the pointer of a balance is immediately transferred, automatically, to a switch mechanism and is there rated in the additive or substractive direction, and this is shown upon a register of that type which is actuated by either negative or positive impulses and which shows the final result. Consequently, the switch mechanism, which includes the counting mechanism, indicates at all times how much material in excess or in deficiency the machine to be tested has consumed at the end of any desired operating time.

The invention also aims to provide a relatively simple and accurate mechanism for weighing in a balance a predetermined number of cigarettes and recording on a web or registration surface the positive or negative actions of the balance under the load, and at the same time to also operate a register so as to show the accumulative, positive or negative operations of the balance, cumulatively over any desired number of weighing operations so that the condition of weight of the products is at all times apparent.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a diagrammatic fragmentary perspective view of a weighing, recording and registering apparatus embodying the features of this invention, and Figure 2 is a top plan view of the balance and recording mechanism, with parts removed.

Referring now to the drawing, 8 indicates the beam of a balance which is supported at its central point upon a fulcrum 9 and which at one end has a bail 10 suspending a pan 11 from the balance, the pan being proportioned to receive a predetermined number of cigarettes or the like, such as 20. Suspended from the other end of the beam 8 is a counterweight 12 proportioned to the combined weights of twenty cigarettes each of the prescribed weight. The beam 8 is provided at its central portion with an upstanding spring pointer or arm 13 which carries in its upper end a marker 14 which projects toward a web 15 or the like of paper or other suitable material upon which the deflections of the arm 13 are to be recorded. The spring arm 13 normally stands out from the web 15 so as to hold the marker 14 in spaced relation to the web, the arm 13 being adapted to be sprung at times toward the web for making a recording mark thereon when desired. The web 15 is divided lengthwise into columns or sections which may be determined by longitudinal lines on the web and at the central portion of the web is a central column 15' indicating a central zone while the other columns are disposed to the right and to the left of the central zone 15' to provide the overweight columns 15² and the opposite underweight columns 15³. These columns 15² and 15³ are graduated upon the web so as to indicate, for instance, one gram of excess and short weight.

The means for springing the balance arm 13 toward the web 15 comprises a transverse lever 16 which is pivoted on a pin 17 or the like with one end of the arm 16 extending across the outer side of the arm 13 and normally held outwardly from the web by a spring 18 suitably anchored to a part of the mechanism. The other arm of the lever 16 overlies the face of a disc 19 provided at one point with a cam 20 adapted to engage beneath the adjacent arm of the lever 16 to swing the arm against the tension of the spring 18 and against and with the pointer 13 to move the marker 14 against the web. A pointer plate 21, of segmental shape, is disposed across the outer face of the web 15 inwardly of the free end of the pointer 13 and is preferably constructed of insulated material. The plate 21 carries toward its opposite ends two groups or series of contacts 22 and 23. These contacts are arranged, in each series, in closely spaced relation, each comprises a spring tongue screwed or otherwise secured at 27 at its upper end to the plate 21, and disposed in relative positions corresponding to the columns 15² and 15³ of the web.

As shown particularly in Figure 2, the contacts of each series, in this instance, are seven in number and correspond with the seven columns on the web at each side of the central zone 15'. Each contact or spring tongue stands out from the plate 21 at its lower end and is provided with a laterally extending finger or arm 24 which overlaps the next contact spaced inwardly toward the central portion of the plate 21 so that upon depression of any one of the contacts, 22 and 23, the contacts spaced inwardly therefrom are consecutively depressed and are closed in a circuit hereinafter described. The plate 21 also carries a plurality of outwardly tapering pins 25 for the purpose of deflecting a correspondingly tapered pin 26 carried upon the upper end of the pointer 13 so that should the pointer be sprung inwardly opposite one of the pins 25, the pointer would be deflected to one side or the other, incident to the wedge shape of the pins 25 and 26, so that the pin 26 would be brought into contact with the adjacent spring contact 22 or 23. The pins 25 and 26 are thus shaped so as to insure the closing of the circuit at the closest adjacent point when the pointer 13 is swung inwardly by the lever 16.

Each contact, 22 and 23, is connected to an electric conductor, such as a wire, and these wires may be grouped into two separate cables, one for each series of contacts 22 and 23 and the cable from the contacts 22 leads to an insulated disc 28 while the other cable from the contacts 23 leads to an insulated disc 29. These discs 28 and 29 are disposed concentrically with a shaft 30. The shaft 30 has one end extending beyond the discs and provided with a pinion 31 which is disposed substantially in the plane of the cam disc 19 and the latter has on its periphery a gear segment 32 adapted, upon each revolution of the disc 19, to mesh with the pinion 31 and turn the same and its shaft 30. The conductors from the contact group 22 and which lead to the disc 28 are independently connected to a corresponding series or number of contacts 1b to 7b, corresponding in number to the number of contacts 22. In like manner, the other conductors leading from the group of contacts 23 are independently and serially connected to the corresponding contacts 1a to 7a of the disc 29. The shaft 30 carries, adjacent the respective discs 28 and 29, insulated hubs or rings 33 and 34 carrying respective slide contacts 33' and 34' adapted to engage the contacts 1b to 7b and 1a to 7a respectively of the discs 28 and 29.

The hubs or rings 33 and 34 are provided respectively with contact brushes 35 and 36 which are in connection by wires 37 and 38 with a counting apparatus 39 of any known construction. A battery 40 is shown as the source of electric energy and is in connection at one side by a wire 41 which leads to the pointer 13, and at its opposite side by a wire 42 which leads to the counting apparatus 39. The counting apparatus 39 suggested is of any well known type which under impulse transmitted over wire 37 adds the impulses and shows the result, and which also subtracts the number of impulses coming over the wire 38 and shows the resultant sum or difference between the impulses of the positive and negative character. By way of example, within a predetermined period of time of operation, should 812 impulses be imparted to the counting apparatus 39 by way of the conductor 37, and 780 impulses be transmitted through the conductor 38, then the counting device 39 would show a reading of "32", which would mean that the conductor actuating the switch mechanism in the positive direction has imparted thirty-two impulses more than the other conductor.

Figure 1 shows diagrammatically that the disc 19 is mounted on the driving shaft 43 and the shaft 43 is adapted to be driven in any suitable manner and may be connected to the mechanism for depositing and removing cigarettes with reference to the balance pan 11.

The operation is as follows:

The mechanism which conveys the cigarettes into the balance pan 11 and counts them and the means which performs the emptying of the balance pan are placed in relation to the drive shaft 43 on which the disc 19 is mounted in such a way that the disc 19 occupies approximately the position shown in Figure 1 when the loading of the balance pan 11 has taken place. After time has been allowed for the balance beam 8 to settle in its final position, the cam 20 or the disc 19 comes into contact with the outer end of the lever 16 and swings the lever on its axis 17 against the tension of the spring 18 and swings the other end of the lever 16 against the pointer 13 and presses the latter in the direction shown by the arrow in Figure 2, or toward the web 15. At this time the marker 14 engages the web 15, and the marker may be of any desired color, and may be in the form of a pencil or the like.

Further rotation of the disc 19 frees the lever 16 immediately after the desired recording has been made on the web. The gear segment 32 is of sufficient length to impart a complete revolution to the pinion 31 and its shaft 30, and any suitable means may be provided for effecting the arrest in rotation of the shaft after the segment 32 has passed the pinion. If, as shown in Figure 1, the cigarettes have exactly the standard weight, then the pointer 13 is not deflected and remains within the zone 15' shown on the web 15 and the contact 26 of the pointer does not come into engagement with any of the contacts 22 or 23. Therefore, during the rotation of the shaft 30 neither of the movable contacts 33' and 34' come into contact with any current conducting part. During the rotation of the shaft 30, accordingly, there does not occur, either in the conductor 37 or the conductor 38, any current impulse which might influence the counting mechanism 39. As soon as the gear segment 32 has rolled off of the pinion 31, the shaft 30 is held fast in any suitable manner from over-running while the lever 16 is released by the cam 20 so that, under the traction of the spring 18, it may again swing into its initial outward position to release the pointer 13 which also springs out from the web 15 and the contact carrying plate 21. At this stage of the operation the balance pan 11 is emptied and refilled with a second group of cigarettes selected from the cigarette making machine so that, when the disc 19 again reaches approximately the position shown in Figure 1, the balance beam has come to rest.

Now, should in the next operation of the apparatus, the group of cigarettes in the pan 11 have an excess weight over four grams, then when the balance beam has come to rest the wedge shape contact 26 is located in front of the contact spring, marked four in Figure 2, of the positive group 22. As the disc 19 swings its cam 20 against the lever 16, the contact 26 of the pointer 13 is forced against the fourth contact spring 22. As the current from the battery 40 passes through the conductor 41 and the pointer 13, the fourth contact is brought into the circuit and in depressing this fourth contact its lateral arm 24 engages and depresses the third contact, and through the arms 24 of the contacts each succeeding contact toward the central or zero position is depressed and connected in circuit so that the circuit passes from the pointer 13 consecutively through the contacts 4, 3, 2 and 1. During the passage of the cam 20 past the lever 16, these contacts are maintained in the circuit while the segment 32 turns the pinion 31 and its shaft 30 with the movable contacts 33' and 34' therewith. The movable contact 33' is in this instance consecutively closed in the circuit as it wipes over the contacts 1b, 2b, 3b, and 4b, thus imparting four impulses to the counting apparatus 39.

This adds four units to the counting apparatus so that, if for example, the counting apparatus had previously registered "18", there would now appear in the reading opening the value or indication "22".

If, in the next ensuing weighing operation, the contact 26 of the pointer arm 13, in consequence of a short weight of three grams of the cigarettes being weighed, were to stop opposite the third spring contact of the negative group 23 of contacts, then, when the pointer 13 is deflected by its cam 20 the contact 26 of the pointer would depress the third contact, and through the arms 24 of the contacts, accordingly depress and connect in circuit the inwardly succeeding contacts 2 and 1. Thus, the contacts 1a, 2a and 3a of the disc 29 would be connected in circuit so that the movable contact 34' in wiping across these contacts would establish three independent impulses through the wire 38 to the counting apparatus 39, the impulses being negative and thus would cause the counting apparatus to subtract the three impulses from the "22" registered so that there would show on the counting apparatus the value or number "19".

It is obvious that various changes and modifications may be made in the details of construction and design of the above specifically described embodiment of this invention without departing from the spirit thereof, such changes and modifications being restricted only by the scope of the following claim.

What is claimed is:

A continuously recording and registering cigarette weighing apparatus, comprising a scale provided with a beam having a pan at one end adapted to receive a number of cigarettes and having at its other end a counterweight for the pan and cigarettes, a pointer arm upstanding from the central portion of the beam and carrying a marker, a recording web having a central and opposite side columns and disposed with its central column opposite the market, right and left rows of successively overlying contacts one for each side column of the web supported in the path of the pointer arm, an electric counter device in circuit with the pointer arm and having an adding means lead and a cooperating subtracting means lead, a continuously operable intermittent device having cam means for periodically depressing the pointer arm to mark the web in the columns thereof corresponding to the position of the arm and the scale at the cam operating period and to engage the arm with the corresponding contact when the scale is out of balance, a pinion engaging the intermittent device for rotating a shaft a full turn during said period of operation of the cam on the pointer arm, a pair of spaced apart contact points fixed on the shaft to turn therewith with one contact point connected to the adding means lead of the counter and the other contact point connected to the substracting means lead of the counter, a stationary disc for each contact point, one disc having fixed contacts adapted to be traversed by its contact point and corresponding in number and in serial connection in one direction with the row of pointer engaging contacts at one side of the web, and the other disc having like fixed contacts in serial connection in the opposite direction with the row of pointer engaging contacts at the other side of the web, whereby during the marking of the web by the pointer the circuit is closed through the series of traversed contacts on the unbalanced side of the scale and the corresponding shaft pointer is turned to traverse the corresponding energized disc contacts and effect adding and subtracting impulses to the counter corresponding to the right and left displacement of the pointer by the scale.

KURT ADOLF KÖRBER.